(12) United States Patent
White

(10) Patent No.: US 6,430,243 B1
(45) Date of Patent: Aug. 6, 2002

(54) SYMBOL SIGN DIRECTED PHASE DETECTOR

(75) Inventor: Hugh E. White, Pennington, NJ (US)

(73) Assignees: Sarnoff Corporation, Princeton, NJ (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/143,813

(22) Filed: Aug. 31, 1998

Related U.S. Application Data

(60) Provisional application No. 60/085,864, filed on May 18, 1998.

(51) Int. Cl.$^7$ ................................................. H03D 3/24
(52) U.S. Cl. ...................................................... 375/376
(58) Field of Search ................................ 375/346, 227, 375/285, 376, 373

(56) References Cited

U.S. PATENT DOCUMENTS

| | | | |
|---|---|---|---|
| 5,706,057 A | | 1/1998 | Strolle et al. ............... 348/426 |
| 5,867,539 A | * | 2/1999 | Koslov ....................... 375/346 |
| 5,894,334 A | * | 4/1999 | Strolle et al. ............... 348/725 |

FOREIGN PATENT DOCUMENTS

| | | | |
|---|---|---|---|
| EP | 0 429 912 A2 | | 11/1990 |
| EP | 0 783 214 A2 | | 7/1997 |
| EP | 0 794 634 A2 | * | 9/1997 ............ H04L/7/33 |
| WO | WO 95 26075 | | 9/1995 |

OTHER PUBLICATIONS

PCT INTERNATIONAL SEARCH REPORT our reference 13018 PCT Application PCT/US99/10826 filing date May 18,1999.

W. Lee, K. Cheun, S. Choi, "A Hardware Efficient Phase/Gain Tracking Loop For the Grand Alliance VSB HDTV Receiver", IEEE Transactions on Consumer Electronics, vol. 42, No. 3, Aug. 1996.

* cited by examiner

*Primary Examiner*—Chi Pham
*Assistant Examiner*—Kevin M. Burd
(74) *Attorney, Agent, or Firm*—William J. Burke

(57) ABSTRACT

A phase detector that uses symbol sign information to aid the phase error detection process to determine a phase error of a complex signal such as a vestigial side band (VSB) signal. The phase detector comprises a subtractor having one input coupled to the I signal (i.e., an unquantized digital value that is sometimes referred to as a quasi-analog signal) and a second input coupled to the data output of a slicer (quantizer) representing the magnitude of a sample point within a symbol (i.e., a digital value representing one of M levels of the VSB signal). The unquantized signal is subtracted from the quantized I signal to produce a ΔI signal. The I signal is also processed to determine the sign of the present symbol. A before-after symbol processor determines the sign values of a previous (before) symbol and a later (after) symbol and compares those signs to the sign of the present symbol. A change in signs from the before symbol to the after symbol will produce a substantial imaginary component in the phase error signal that can easily be tracked by the phase tracking loop. If the signs of the symbols (before-to-after) do not change, then the imaginary component of the phase error will be very small and nearly impossible to track and compensate. As such, the loop is disabled when the before-after processor detects such a symbol sign combination. As such the symbol sign information is used to "correct" or "gate" the phase error. This phase error signal is used in a digital television receiver to extract a data signal from a VSB signal for demodulation.

4 Claims, 4 Drawing Sheets

SYMBOL SIGN DIRECTED PHASE DETECTOR

This patent application claims benefit of U.S. provisional patent application serial No. 60/085,864, filed May 18, 1998 the disclosure of which is incorporated herein by reference.

The invention generally relates to digital television signal receivers and, more particularly, the invention relates to a phase detector for a vestigial side band (VSB) signal receiver.

BACKGROUND OF THE DISCLOSURE

To accurately extract data from a vestigial side band (VSB) signal as used, for example, in a high definition television (HDTV) transmission system the VSB signal must be demodulated by an oscillator that recovers the data bearing real part of the base band VSB signal for input to the quantizer (slicer). FIG. 1 depicts a block diagram of a conventional phase tracking loop 100 for a digital television receiver. This conventional loop is defined in the "Guide To The Use Of The ATSC Digital Television Standard", Document A/54, Advanced Television Systems Committee, Apr. 12, 1995. The standard suggests using a phase tracking loop that operates only upon a real signal (e.g., the in-phase (I) signal). As such, to determine a phase error of the VSB signal, the quadrature phase (Q) signal is derived from the I signal. Because the I and Q components of a VSB signal are related by a filter function that is approximately a Hilbert transform, a filter 104 is used to derive a Q signal from the I signal. The filter is a finite impulse response (FIR) filter having fixed anti-symmetric coefficients and with every other coefficient equal to zero. The I signal is delayed in delay 102 for a period equal to half the length of the filter 104.

To compensate for the phase error, the I and Q signals are coupled to a complex multiplier 106 that is driven by an oscillator 112 (e.g., a numerically controlled oscillator (NCO)) that is, in turn, controlled by an error signal from a phase detector 108. The phase of the NCO output signal is modulated to correct the phase error and produce phase adjusted I and Q signals (I' and Q'). The phase detector 108 processes the I' signal and the derived Q' signal to produce a phase error detection signal (e) that represents the phase error of the VSB signal. A loop filter 110 (a low pass filter) is used to filter the higher order components from the error signal e. In effect, the combination of the oscillator signal and the I and Q input signals within the complex multiplier 102 creates derotated I' and Q' signals. The depicted circuit 100 is a closed loop phase tracking circuit that compensates for carrier phase error in the I and Q signals such that a relatively stable in-phase (I') signal is created that can be sampled within a demodulator to extract data from the VSB signal. One example of a phase tracking circuit that uses a derived Q component is described by Lee et al. in "A Hardware Efficient Phase/Gain Tracking Loop For The Grand Alliance VSB HDTV Receiver," IEEE Trans. on Consumer Electronics, pp. 632–639, Vol. 42, No. 3, August 1996 and U.S. Pat. No. 5,706,057 issued Jan. 6, 1998.

FIG. 2 illustrates the real (I) and imaginary (Q) components of a VSB signal in the time domain. The figure represents the principal components of an isolated symbol, i.e., a symbol that is surrounded by many zero amplitude symbols and illustrates the Hilbert transform relation between I and Q components of a VSB signal. In a sequence of non-zero symbols, the waveforms of FIG. 2 are replicated along the time axis at the symbol period. The negative amplitude symbols have waveforms that are inverted from those of FIG. 2. As such, the imaginary part of a given symbol contains energy that is contributed by its two adjacent symbols. For example, in a sequence of three symbols, if the first symbol ("before" symbol) and the third symbol ("after" symbol) have a different polarity, the imaginary component of the second symbol will have either a large positive or large negative value. In contrast, when the first symbol and third symbol have the same polarity, the imaginary component of the second symbol will have a small value. This inter symbol interference (ISI) causes a phase error in the detected phase of the VSB signal that would not be corrected by the phase tracking loop of FIG. 1. In essence, the phase error produced by the communication channel is modulated by the relative sign of the symbols in a symbol sequence without regard to phase error caused by the channel. Consequently, this component of the phase error becomes random noise with respect to the symbol decoding process and can cause errors in the phase tracking process.

Therefore, a need exists in the art for a phase detector that uses symbol sign information to improve the accuracy of the phase detection process.

SUMMARY OF THE INVENTION

The disadvantages heretofore associated with the prior art are overcome by a phase detector that uses symbol sign information to aid the phase error detection process to determine a phase error of a complex signal such as a vestigial side band (VSB) signal. The phase detector comprises a subtractor having one input coupled to the I signal (i.e., an unquantized digital value that is sometimes referred to as a quasi-analog signal) and a second input coupled to the data output of a slicer (quantizer) representing the magnitude of a sample point within a symbol (i.e., a digital value representing one of M levels of the VSB signal). The unquantized I signal is subtracted from the quantized I signal to produce a $\Delta I$ signal. The I signal is also processed to determine the sign of the present symbol. A before-after symbol processor determines the sign values of a previous (before) symbol and a later (after) symbol and compares those signs to the sign of the present symbol. A change in signs from the before symbol to the after symbol will produce a substantial imaginary component in the phase error signal that can easily be tracked by the phase tracking loop. If the signs of the symbols (before-to-after) do not change, then the imaginary component of the phase error will be very small and nearly impossible to track and compensate. As such, the loop is disabled when the before-after processor detects such a symbol sign combination. As such the symbol sign information is used to "correct" or "gate" the phase error. This phase error signal is used in a digital television receiver to extract a data signal from a VSB signal for demodulation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
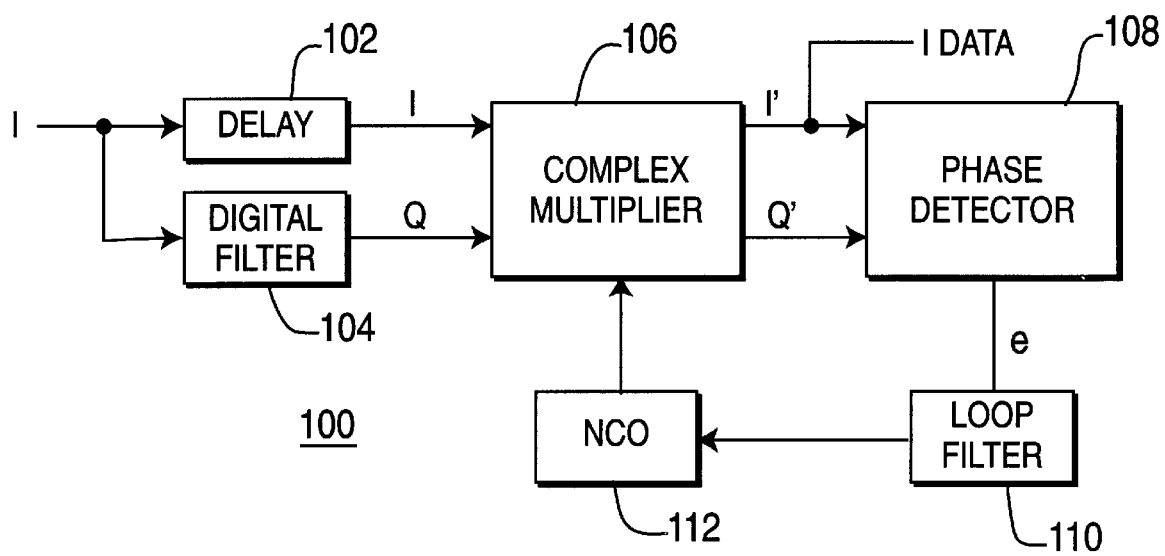
FIG. 1 depicts a block diagram of a prior art phase tracking loop for a digital television signal receiver.
Figure 2:
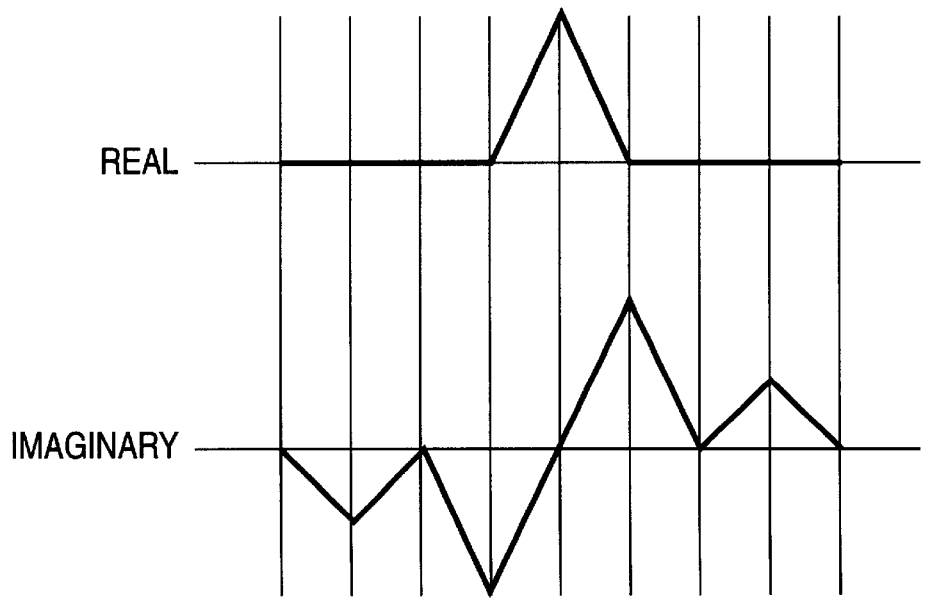
FIG. 2 illustrates the principal real and imaginary components of one symbol of a VSB signal.
Figure 3:
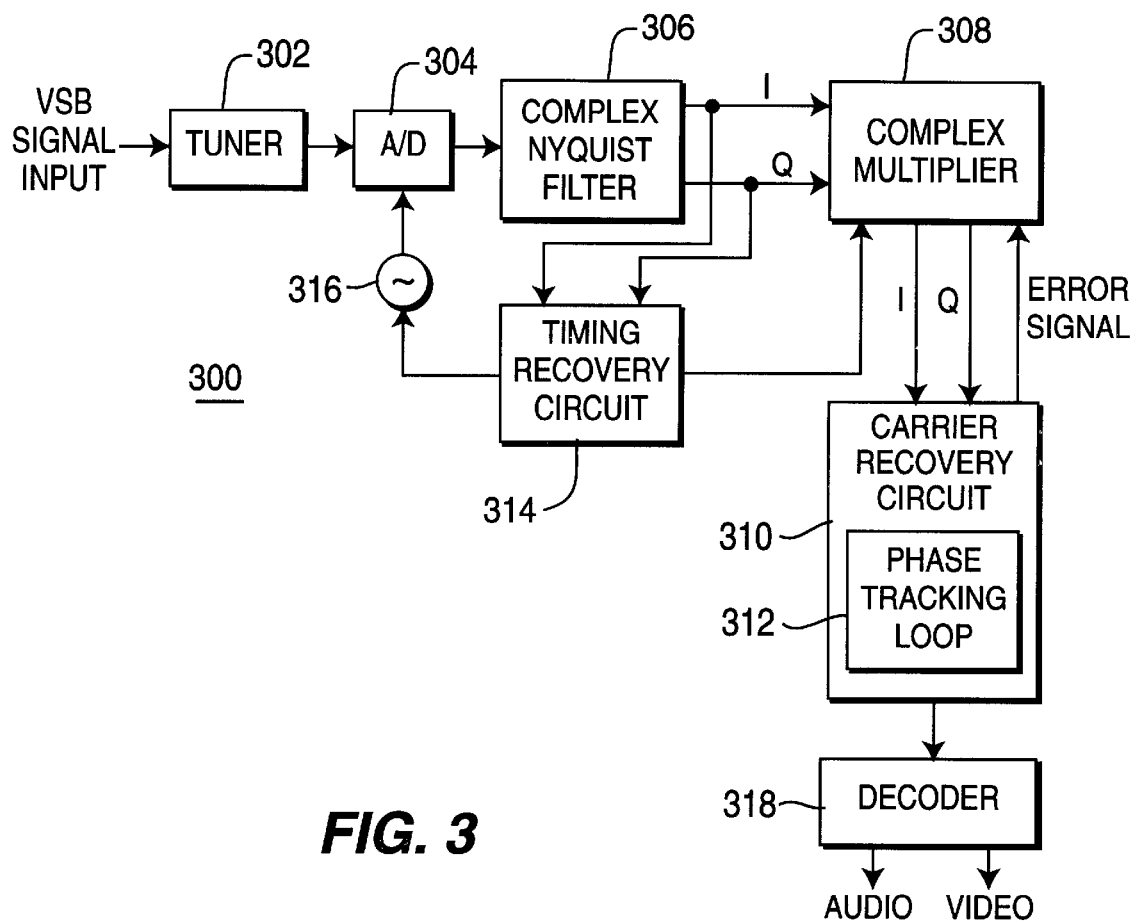
FIG. 3 depicts a block diagram of a digital television receiver for demodulating VSB signals using a phase detector of the present invention.

FIG. 3 depicts a simplified, high level block diagram of a vestigial sideband (VSB) signal receiver 300 of a type that is used in digital television receivers. The receiver 300 contains a tuner 302, an analog-to-digital (A/D) converter 304, an oscillator 316, a complex Nyquist filter 306, a complex equalizer 308, a timing recovery circuit 314, a carrier recovery circuit 310 and a decoder 318. A band of frequency containing VSB signals is coupled from an antenna or cable television system (not shown) to the tuner 302. The tuner 302 selects a single VSB signal from the available digital television signal band and produces that selected VSB signal at a passband (e.g., IF) frequency. The passband VSB signal is converted to a digital signal by the A/D converter 304 such that the analog VSB signal is digitized generally by a sampling signal having a rate that is one to four times the VSB symbol rate. The sampling signal is produced by the oscillator 316. The digitized VSB signal (a quasi-analog signal) is coupled to the complex Nyquist filter 306 which extracts an in-phase (I) signal and a quadrature phase (Q) signal from the VSB signal.

The I and Q signals are coupled to both a complex equalizer 308 and a timing recovery circuit 314. The timing recovery circuit 314 recovers symbol timing information and provides a timing adjustment signal to the oscillator 316. As such, the symbols in the passband digital signal are optimally sampled by the A/D converter 304. The complex equalizer 308 is a passband equalizer that adaptively equalizes the I and Q signals to remove transmission channel distortion from the signals such that the signals can be demodulated with little inter-symbol interference (ISI). The equalized I and Q signals are coupled to the carrier recovery circuit 310 that contains the phase tracking loop 312 of the present invention.

The carrier recovery circuit 310 recovers the data bearing real part of the VSB signal. This I signal is coupled from the carrier recovery circuit 310 to the decoder 318 where the data is extracted from the I signal. The decoder 318 ultimately produces audio and video signals for display.

Figure 4:
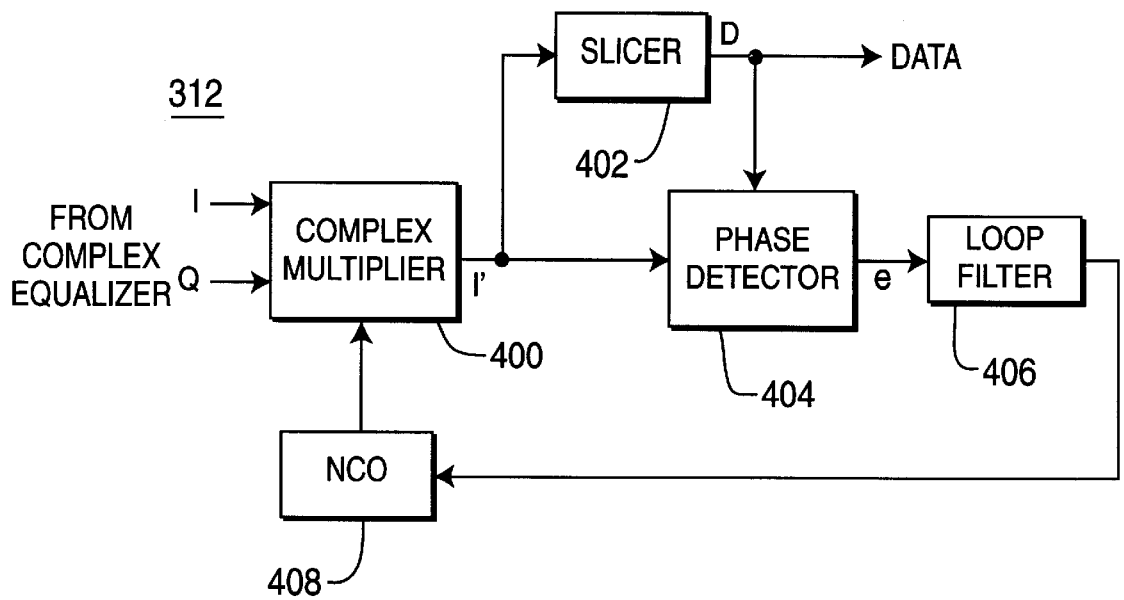
FIG. 4 depicts a phase tracking loop incorporating the phase detector of the present invention.

FIG. 4 depicts a block diagram of a phase tracking loop 312 that incorporates the present invention. The loop 312 contains a complex multiplier 400, a data slicer 402, a phase detector 404, a loop filter 406, and a numerically controlled oscillator (NCO) 408. The inputs to the multiplier 400 are the in-phase (I) signal and the quadrature phase (Q) signal (quasi-analog digital signals) that have been extracted from a VSB signal and equalized. The output of the NCO 408 is coupled to one input of the multiplier 400 such that multiplying the NCO output signal with the I and Q signals should, if the loop is operating properly, derotate the I signal, remove any phase jitter and produce a stable I' signal that can be sampled (sliced) at an optimal location within the symbol to provide the greatest magnitude I' signal (i.e., the sample accurately represents the transmitted symbol level).

The output of the complex multiplier (the in-phase (I') signal) is coupled to the input of the slicer (quantizer) 402 that samples the I' signal on a periodic basis. The sampling rate is substantially the same as the symbol rate and the intent is for the slicer to sample the real (information bearing) part of the base band VSB signal. Any phase error between the received VSB signal and the NCO will result in the slicer sampling a mixture of the real and imaginary components of the VSB signal. The output of the slicer 402 is the data signal D that represents magnitude samples of the I' signal. In 8-VSB, there are eight different levels or symbol values generated by the slicer 402. The quantized I' signal (the data signal D) is coupled to one input of the phase detector 404 and the I' signal is coupled to a second input of the phase detector 404. The phase detector 404 uses the quantized and unquantized I signals to operate in a symbol sign gated mode such that the data decisions made by the slicer 402 are used to accurately generate a phase error (e) and the phase detector output is disabled when incorrect phase error information may be produced. The phase error is coupled through the loop filter 406 that low pass filters the error signal to produce a control signal for the NCO 408. As such, the phase of the NCO 408 is adjusted in response to the phase error produced by the phase detector 404 such that the output signals from the NCO compensate for the phase error of the VSB signal and the slicer will optimally sample the I' signal.

Figure 5:
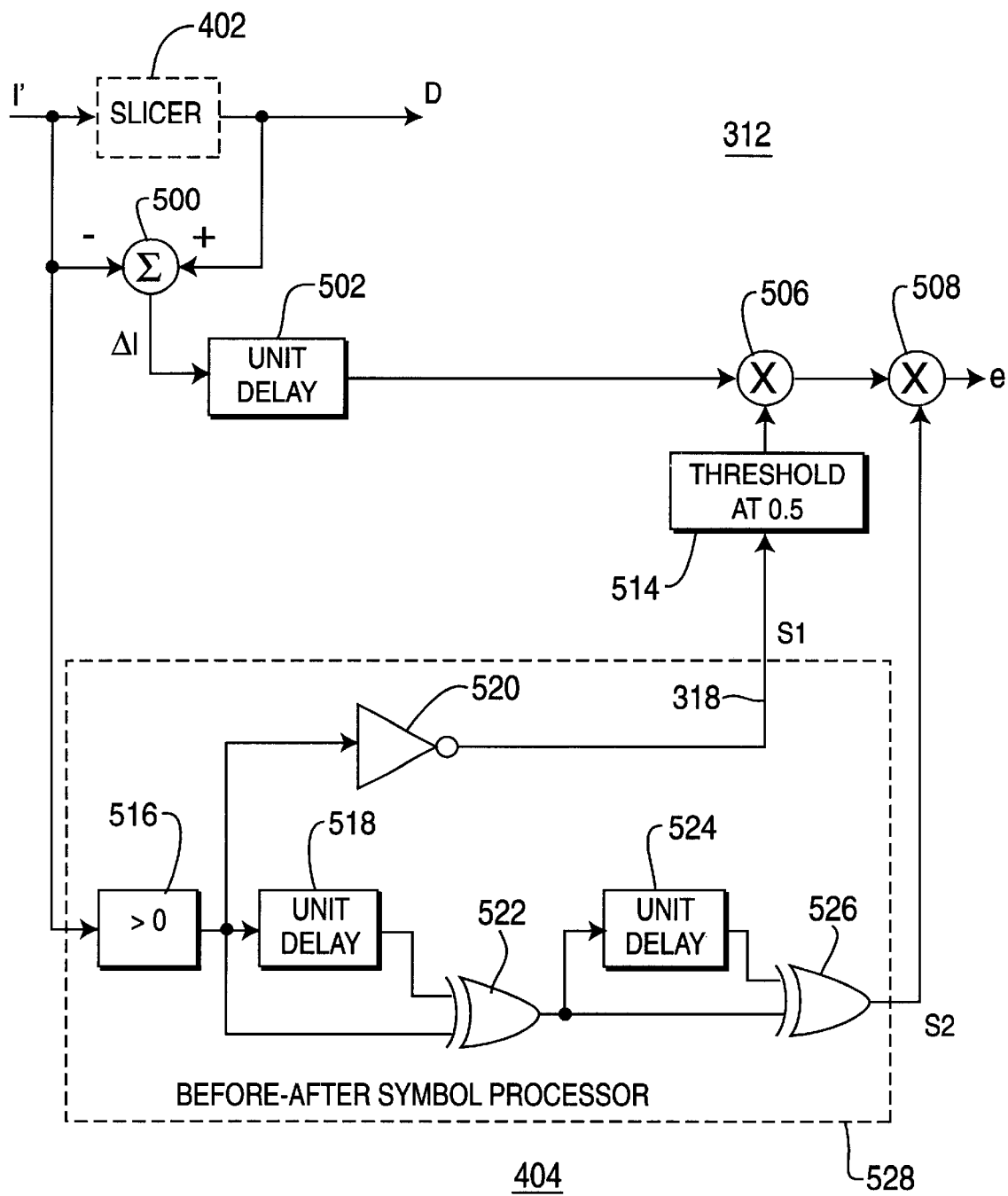
FIG. 5 depicts a detailed block diagram of the phase detector of the present invention.
Figure 6:
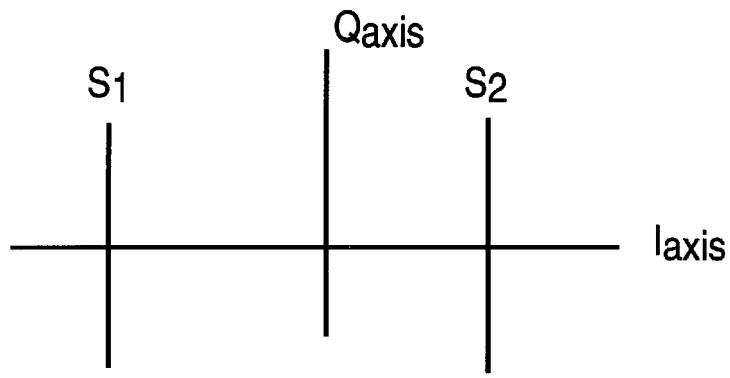
FIG. 6 depicts a scatter plot for a 2-VSB signal.
Figure 7:
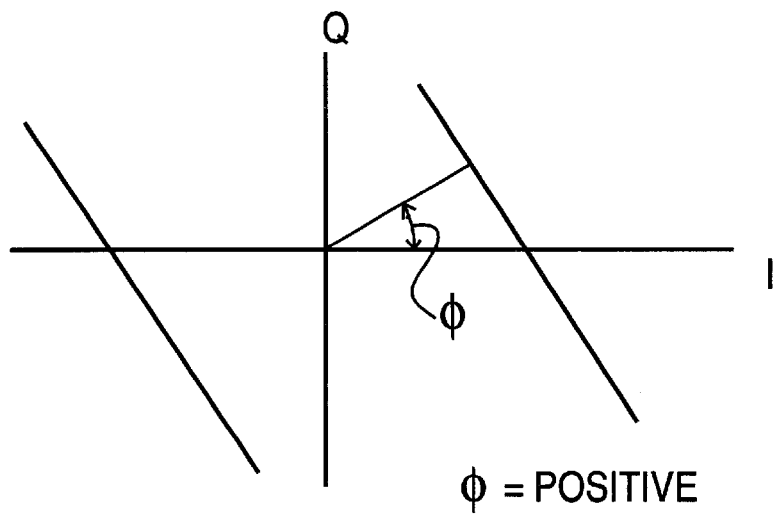
FIG. 7 depicts a scatter plot of a 2-VSB signal having a positive phase error.
Figure 8:
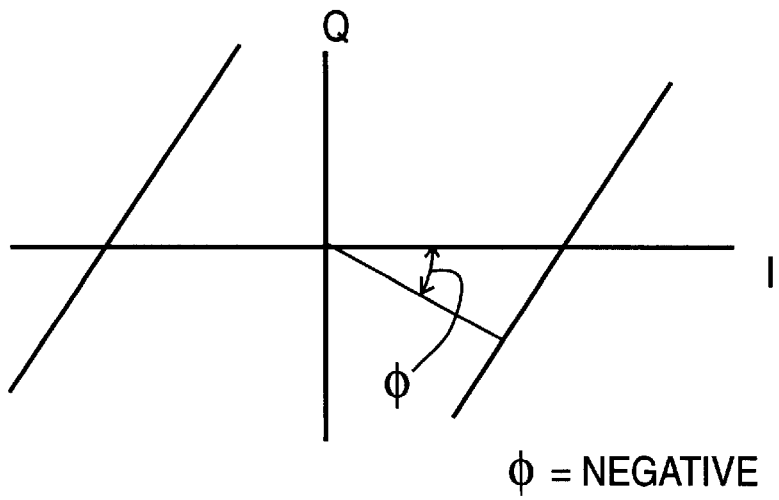
FIG. 8 depicts a scatter plot of a 2-VSB signal having a negative phase error.

FIG. 5 depicts the symbol sign directed phase detector 404 of FIG. 4. In a VSB signal, the expected constellation contains I values that have discrete, known levels, e.g., eight levels for an HDTV signal. For simplification of the following description, a two level VSB signal (2-VSB) is assumed to be the input signal. The Q values are variable such that the constellation (scatter plot) appears as, for example, two vertical lines when viewed on a Q value (vertical axis) versus I value (horizontal axis) graphical plot of FIG. 6. Phase rotation of the VSB signal produces an angle between the received constellation locations and the expected constellation, e.g., the vertical lines are skewed at an angle corresponding to the phase angle. FIGS. 7 AND 8 respectively depict scatter plots of a 2-VSB signal having a positive and a negative phase error. In the detector 404, the angle φ is determined as the phase error signal e (the difference between the sampled and unsampled I' signal) that is coupled to the NCO.

Specifically, the I' signal is coupled to a minus (−) terminal of a combiner 500 and the decision signal D is coupled to the plus (+) terminal of the combiner 500 (operating as a subtractor) such that the unquantized I' signal is subtracted from the quantized I' signal to produce a ΔI signal (phase error). The ΔI signal is coupled to a unit delay 502 that delays the ΔI signal by one symbol period. The before-after symbol processor 528 analyzes a three symbol set (e.g., symbols 1, 2 and 3; where symbol 2 is the current symbol, symbol 1 is the "before" symbol and symbol 3 is the "after" symbol). The processor 528 determines the sign of each symbol and compares the determined signs to form one signal (S1) that represents the expected sign of the imaginary part of symbol 2 and a second signal (S2) that is used to gate the error signal output of the phase detector.

As discussed in the background above, if the first and the third symbols have signs that differ, the phase error will be greater than a nominal value merely due to the relative symbol signs, i.e., if the first and third symbols have opposite signs the imaginary part of symbol 2 has a large positive or negative component. Such a large component can be tracked by the loop. Conversely, if the signs of symbols 1 and 3 have the same sign, the phase error associated with the symbol 2 will be substantially less than a nominal value. As such, the phase error will not be large enough to be tracked by the loop and the loop may erroneously alter the phase of the NCO. As such, in response to this symbol sign combination, the phase error signal is disabled (gated) to ensure that for that particular symbol the phase of the NCO will not be changed.

Specifically, the before-after processor 528 provides an expected sign value for the imaginary part of symbol 2 and determines if the imaginary part of symbol 2 has sufficient amplitude to provide an accurate measure of phase error.

The unquantized I' signal is also coupled to a sign determination block 516 which creates a HIGH output signal whenever the I' unquantized signal is greater than zero (i.e., positive). The signal from the block 516 is coupled to a unit delay 518 that delays the signal by one symbol period. The output of the block 516 is also coupled to inverter 520. The output of inverter 520 represents the expected sign of the imaginary part of symbol 2 the output is HIGH if the imaginary part of symbol 2 is positive; otherwise, the output is LOW. The output of inverter 520 is applied to a threshold block 514 which generates +1 output whenever the signal from inverter 520 greater than 0.5; otherwise, the output is −1. The output of the threshold block 514 is coupled to a multiplier 506. The multiplier multiplies the ΔI signal from block 502 with the output of the threshold block 514. As such, a sign change at the output of block 514 will cause a sign change of the ΔI signal. The sign corrected phase error signal is coupled to an input of multiplier 508.

The output of XOR gate 522 (a symbol sign change signal) is coupled to a unit delay 524 which delays the symbol sign change signal by one symbol. The output of the unit delay 524 is coupled to a second XOR gate 526 along with the input of the unit delay 524. The output of XOR gate 526 is coupled to one input of the multiplier 508. The output signal from XOR gate 526 is a gating signal (S2) that causes a zero output from multiplier 508 if the expected imaginary component is not large and the error signal could be erroneous; otherwise the sign corrected error signal passes through multiplier 508 to be used to control the NCO. The expected imaginary component is deemed "not large" when the first and third symbols have the same polarity (sign).

The following table summarizes the signals that affect the sign of the output signal of phase detector 404 of FIG. 5 (this table shows signal values for each quadrant in FIGS. 7 and 8):

|  | Sign of ΔI | Symbol 3 Sign | Expected Sign of Imaginary Part of Symbol 2 | Output of Threshold Block 514 | Sign of Error output e |
|---|---|---|---|---|---|
| FIG. 7 Quadrant |  |  |  |  |  |
| 1 | positive | neg = 0 | pos = 1 | +1 | pos |
| 2 | positive | neg = 0 | pos = 1 | +1 | pos |
| 3 | negative | pos = 1 | neg = 0 | −1 | pos |
| 4 | negative | pos = 1 | neg = 0 | −1 | pos |
| FIG. 8 Quadrant |  |  |  |  |  |
| 1 | negative | neg = 0 | pos = 1 | +1 | neg |
| 2 | negative | neg = 0 | pos = 1 | +1 | neg |
| 3 | positive | pos = 1 | neg = 0 | −1 | neg |
| 4 | positive | pos = 1 | neg = 0 | −1 | neg |

In the event there are two sign changes; symbol 1 to 2 and symbol 2 to 3, or no sign changes; then symbol 1 and symbol 3 will be the same sign and phase detector output will be gated off by multiplier 508.

Although various embodiments which incorporate the teachings of the present invention have been shown and described in detail herein, those skilled in the art can readily devise many other varied embodiments that still incorporate these teachings.

What is claimed is:

1. A phase detector for detecting the phase error of a complex signal comprising:

a subtractor having a first input coupled to an in-phase (I) signal and a second input coupled to a quantized I signal wherein the quantized I signal is subtracted from the I signal to produce a ΔI signal;

a before-after symbol processor, having the I signal as an input, for processing a plurality of symbols to determine the signs of each symbol and determine changes in the signs from one symbol to the next, in response to the signs of each symbol the before-after symbol processor produces a phase error sign correction signal and a phase error gating signal, wherein said before after symbol processor further comprises:

a symbol sign determination circuit, having the I signal as an input, for producing a current symbol sign signal, said symbol sign determination circuit comprising:

a sign detector for producing a sign signal;

an inverter for inverting the sign signal; and a threshold processor for producing said phase error sign correction signal as a +1 when the inverted sign signal is greater than 0.5 and a −1 when the inverted sign signal is less than 0.5;

a first delay for delaying said current symbol sign signal;

a first XOR gate for performing an exclusive OR function upon said current symbol sign signal and said delayed current sign signal to produce a sign change signal that indicates a sign change between the current symbol and the previous symbol;

a second delay for delaying said sign change signal;

a second XOR gate for performing an exclusive OR function upon the delayed sign change signal and the sign change signal to produce the phase error gating signal;

a first multiplier having said ΔI signal as a first input and said phase error sign correction signal as a second input and having an output that is a sign corrected phase error signal; and a second multiplier having said sign corrected phase error signal as a first input and said phase error gating signal.

2. A phase tracking loop comprising:

a complex multiplier for producing a phase error corrected signal;

a slicer for producing a quantized value of the phase error corrected signal;

a symbol sign directed phase detector for processing the quantized value of the phase error corrected signal and the phase error corrected signal to produce a phase error, said symbol sign directed phase detector comprising:

a subtractor having a first input coupled to the phase error corrected signal and a second input coupled to a quantized phase error corrected signal wherein the quantized phase error corrected signal is subtracted from the phase error corrected signal to produce a ΔI signal;

a before-after symbol processor, having the phase error corrected signal as an input for processing a plurality of symbols to determine the signs of each symbol and determine changes in the signs from one symbol to the next, in response to the signs of each symbol the before after symbol processor produces a phase error sign correction signal and a phase error gating signal, wherein said before-after symbol processor comprises:
   a symbol sign determination circuit, having the phase error corrected signal as an input, for producing a current symbol sign signal, said symbol sign determination circuit comprising:
     a sign detector for producing a sign signal;
     an inverter for inverting the sign signal; and
     a threshold processor for producing said phase error sign correction signal as a +1 when the inverted sign signal is greater than 0.5 and a −1 when the inverted sign signal is less than 0.5;
   a first delay for delaying said current symbol sign signal;
   a first XOR gate for performing an exclusive OR function upon said current symbol sign signal and said delayed current sign signal to produce a sign change signal that indicates a sign change between the current symbol and the previous symbol;
   a second delay for delaying said sign change signal; and
   a second XOR gate for performing an exclusive OR function upon the delayed sign change signal and the sign change signal to produce the phase error gating signal;
   a first multiplier having said ΔI signal as a first input and said phase error sign correction signal as a second input and having an output that is a sign corrected phase error signal; and
   a second multiplier having said sign corrected phase error signal as a first input and said phase error gating signal;
a loop filter for filtering said phase error; and
an oscillator for producing a drive signal for said complex multiplier having a phase that is adjusted in response to said filtered phase error.

3. A digital television signal receiver comprising:
a tuner for selecting a signal from a band of signals;
an analog-to-digital converter for digitizing the selected signal;
a filter for producing an in-phase (I) signal and a quadrature (Q) phase signal from said selected signal;
a complex equalizer for reducing Inter symbol interference in said I and Q signals;
a carrier recovery circuit having a phase tracking loop containing a complex multiplier for producing a phase error corrected I signal in response to the equalized I signal, a slicer for producing a quantized value of the phase error corrected I signal, a symbol sign directed phase detector for processing the quantized value of the phase error corrected I signal and the phase error corrected I signal to produce a phase error, a loop filter for filtering said phase error, and an oscillator for producing a drive signal for said complex multiplier having a phase that is adjusted in response to said filtered phase error, wherein said symbol sign directed phase detector comprises:
   a subtractor having a first input coupled to the phase error corrected signal and a second input coupled to a quantized phase error corrected signal wherein the quantized phase error corrected signal is subtracted from the phase error corrected signal to produce a ΔI signal;
   a before-after symbol processor, having the phase error corrected signal as an input, for processing a plurality of symbols to determine the signs of each symbol and determine changes in the signs from one symbol to the next, in response to the signs of each symbol the before after symbol processor produces a phase error sign correction signal and a phase error gating signal, wherein said before-after symbol processor comprises:
     a symbol sign determination circuit, having the phase error corrected signal as an input, for producing a current symbol sign signal, said symbol sign determination circuit comprising:
        a sign detector for producing a sign signal;
        an inverter for inverting the sign signal; and
        a threshold processor for producing said phase error sign correction signal as a +1 when the inverted sign signal is greater than 0.5 and a −1 when the inverted sign signal is less than 0.5;
     a first delay for delaying said current symbol sign signal;
     a first XOR gate for performing an exclusive OR function upon said current symbol sign signal and said delayed current sign signal to produce a sign change signal that indicates a sign change between the current symbol and the previous symbol;
     a second delay for delaying said sign change signal; and
     a second XOR gate for performing an exclusive OR function upon the delayed sign change signal and the sign change signal to produce the phase error gating signal;
     a first multiplier having said ΔI signal as a first input and said phase error sign correction signal as a second input and having an output that is a sign corrected phase error signal; and
     a second multiplier having said sign corrected phase error signal as a first input and said phase error gating signal; and
   a decoder for decoding the quantized value of the phase error corrected I signal to produce audio and video signals.

4. A method of performing symbol sign directed phase detection comprising the steps of:
subtracting a quantized in-phase (I) signal from an unquantized I signal to produce a ΔI signal;
processing a plurality of symbols to determine the signs of each symbol and determine changes in the signs from one symbol to the next, in response to the signs of each symbol the before after symbol processor produces a phase error sign correction signal and a phase error gating signal, wherein said processing step comprises:
   determining a sign of a current symbol, wherein said determining step comprises:
     producing a sign signal for the I signal;
     inverting the sign signal; and
     producing said phase error sign correction signal as a +1 when the inverted sign signal is greater than 0.5 and a −1 when the inverted sign signal is less than 0.5;
   delaying the current symbol sign;
   performing an exclusive OR function upon said current symbol sign and said delayed current sign to produce a sign change signal that indicates a sign change between the current symbol and the previous symbol;

delaying said sign change signal; and performing an exclusive OR function upon the delayed sign change signal and the sign change signal to produce the phase error gating signal;

multiplying said $\Delta I$ signal with said phase error sign correction signal to produce a sign corrected phase error signal; and gating said sign corrected phase error signal in response to said phase error gating signal.

* * * * *